United States Patent
Riehl et al.

(10) Patent No.: US 10,014,724 B2
(45) Date of Patent: Jul. 3, 2018

(54) OPEN-CIRCUIT IMPEDANCE CONTROL OF A RESONANT WIRELESS POWER RECEIVER FOR VOLTAGE LIMITING

(71) Applicant: MediaTek Singapore Pte. Ltd., Singapore (SG)

(72) Inventors: Patrick Stanley Riehl, Cambridge, MA (US); Anand Satyamoorthy, Somerville, MA (US); Hasnain Akram, Woburn, MA (US)

(73) Assignee: MEDIATEK Singapore Pte. Ltd., Solaris (SG)

( * ) Notice: Subject to any disclaimer, the term of this patent is extended or adjusted under 35 U.S.C. 154(b) by 931 days.

(21) Appl. No.: 14/355,212

(22) PCT Filed: Sep. 27, 2013

(86) PCT No.: PCT/US2013/062066
§ 371 (c)(1),
(2) Date: Apr. 30, 2014

(87) PCT Pub. No.: WO2014/052686
PCT Pub. Date: Apr. 3, 2014

(65) Prior Publication Data
US 2014/0246923 A1    Sep. 4, 2014

Related U.S. Application Data

(60) Provisional application No. 61/706,932, filed on Sep. 28, 2012.

(51) Int. Cl.
*H01F 38/00*    (2006.01)
*H02J 50/12*    (2016.01)
(Continued)

(52) U.S. Cl.
CPC .............. *H02J 50/12* (2016.02); *H02J 5/005* (2013.01); *H02J 17/00* (2013.01)

(58) Field of Classification Search
CPC .................................. H02J 17/00; H02J 5/005
(Continued)

(56) References Cited

U.S. PATENT DOCUMENTS

| 2011/0053500 A1 | 3/2011 | Menegoli |
| 2012/0043887 A1 | 2/2012 | Mesibov |

(Continued)

FOREIGN PATENT DOCUMENTS

| CN | 102113195 A | 6/2011 |
| CN | 102132292 A | 7/2011 |

OTHER PUBLICATIONS

Office Communication dated Aug. 3, 2016 for Chinese Application No. 201380051118.0.

(Continued)

*Primary Examiner* — Alfonso Perez Borroto
(74) *Attorney, Agent, or Firm* — Wolf, Greenfield & Sacks, P.C.

(57) ABSTRACT

A resonant wireless power (RWP) receiver is provided that includes an inductor element that couples with a resonant wireless power source. A capacitor arrangement is coupled to the inductor element altering the open-circuit impedance of the RWP receiver to reduce the ac voltage under certain defined situations. The capacitor arrangement includes a plurality capacitors tuned to a control ac voltage in the RWP receiver.

18 Claims, 5 Drawing Sheets

(51) Int. Cl.
*H02J 17/00* (2006.01)
*H02J 5/00* (2016.01)

(58) Field of Classification Search
USPC .......................................... 307/104
See application file for complete search history.

(56) References Cited

U.S. PATENT DOCUMENTS

| 2012/0068548 | A1 | 3/2012 | Endo |
| 2012/0127765 | A1 | 5/2012 | Maruyama |
| 2012/0235634 | A1* | 9/2012 | Hall ......................... H03H 7/40 320/108 |
| 2012/0235636 | A1 | 9/2012 | Partovi |

OTHER PUBLICATIONS

"International Search Report" dated Dec. 11, 2013 for International application No. PCT/US13/62066, International filing date: Sep. 27, 2013.

* cited by examiner

OPEN-CIRCUIT IMPEDANCE CONTROL OF A RESONANT WIRELESS POWER RECEIVER FOR VOLTAGE LIMITING

PRIORITY INFORMATION

This application is a National Stage filing under 35 U.S.C. § 371 of International Patent Application Ser. No. PCT/US2013/062066, filed Sept. 27, 2013, entitled "OPEN-CIRCUIT IMPEDANCE CONTROL OF A RESONANT WIRELESS POWER RECEIVER FOR VOLTAGE LIMITING", which claims priority to U.S. Provisional Application Ser. No. 61/706,932, filed Sep. 28, 2012, titled "OPEN-CIRCUIT IMPEDANCE CONTROL OF A RESONANT WIRELESS POWER RECEIVER FOR VOLTAGE LIMITING", each of which is incorporated herein by reference in its entirety.

BACKGROUND OF THE INVENTION

The invention is related to the field of resonant wireless power (RWP), and in particular to an open-circuit impedance control of a RWP receiver for voltage limiting.

A resonant wireless power receiver includes a matching network designed to resonate at the frequency of power transfer. This feeds into a semiconductor rectifier, then a dc/dc converter in order to convert the AC power to regulated DC. If the magnitude of the AC voltage exceeds the operating voltage of the rectifier, or if the rectified voltage exceeds the operating voltage of the dc/dc converter, these circuits can be damaged.

SUMMARY OF THE INVENTION

According to one aspect of the invention, there is provided a resonant wireless power (RWP) receiver. The RWP receiver includes an inductor element that couples with a resonant wireless power source. A capacitor arrangement is coupled to the inductor element altering the open-circuit impedance of the RWP receiver to reduce the ac voltage under certain defined situations. The capacitor arrangement includes a plurality capacitors tuned to a control ac voltage in the RWP receiver.

According to another aspect of the invention, there is provided a resonant wireless power (RWP) system. The RWP system includes a source circuit having a reflected impedance in series with a source coil. A receiver circuit is coupled to the source circuit using an inductor element, and includes a capacitor arrangement coupled to the inductor element altering the open-circuit impedance of the receiver circuit to reduce the ac voltage under certain defined situations. The capacitor arrangement includes a plurality capacitors tuned to a control ac voltage in the receiver circuit.

DETAILED DESCRIPTION OF THE INVENTION

The invention provides novel techniques for adaptively altering the open-circuit impedance of the resonant receiver to reduce the ac voltage under certain defined situations.

Figure 1:
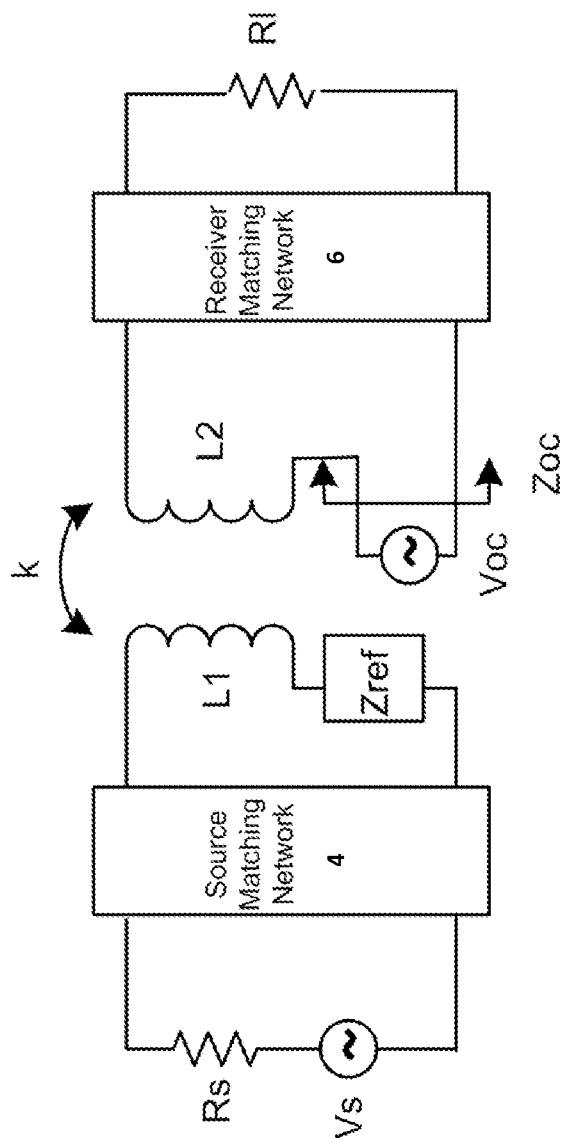
FIG. 1 is a schematic diagram illustrating a resonant wireless power (RWP) system used in accordance with the invention.

FIG. 1 shows a resonant wireless power (RWP) system. There are two complex impedances that can be used to describe most of the important aspects of a RWP system: the open-circuit impedance Zoc and the reflected impedance Zref. Mutual inductance, or coupling, between the source coil L1 and receiver coil L2 can be modeled in a number of different ways.

In this case, the coupling k is modeled as a current-controlled voltage source Voc in series with the receiver coil L2. The impedance seen by this voltage source Voc, which includes the coil L2, matching network 6 and load (e.g., rectifier, dc/dc, load current) R1, is Zoc. On the source side, when coupling is present, one can model the effect of the coupling as an impedance in series with the source coil L1 called Zref, the reflected impedance. Both the open-circuit impedance and the reflected impedance are complex quantities—they have real (resistive) and imaginary (reactive) components. For a 1:1 RWP system, the reflected impedance is related to the open-circuit impedance by this formula:

$$Z_{ref} = \frac{(\omega M)^2}{Z_{oc}} \qquad \text{Eq. 1}$$

Figure 2:
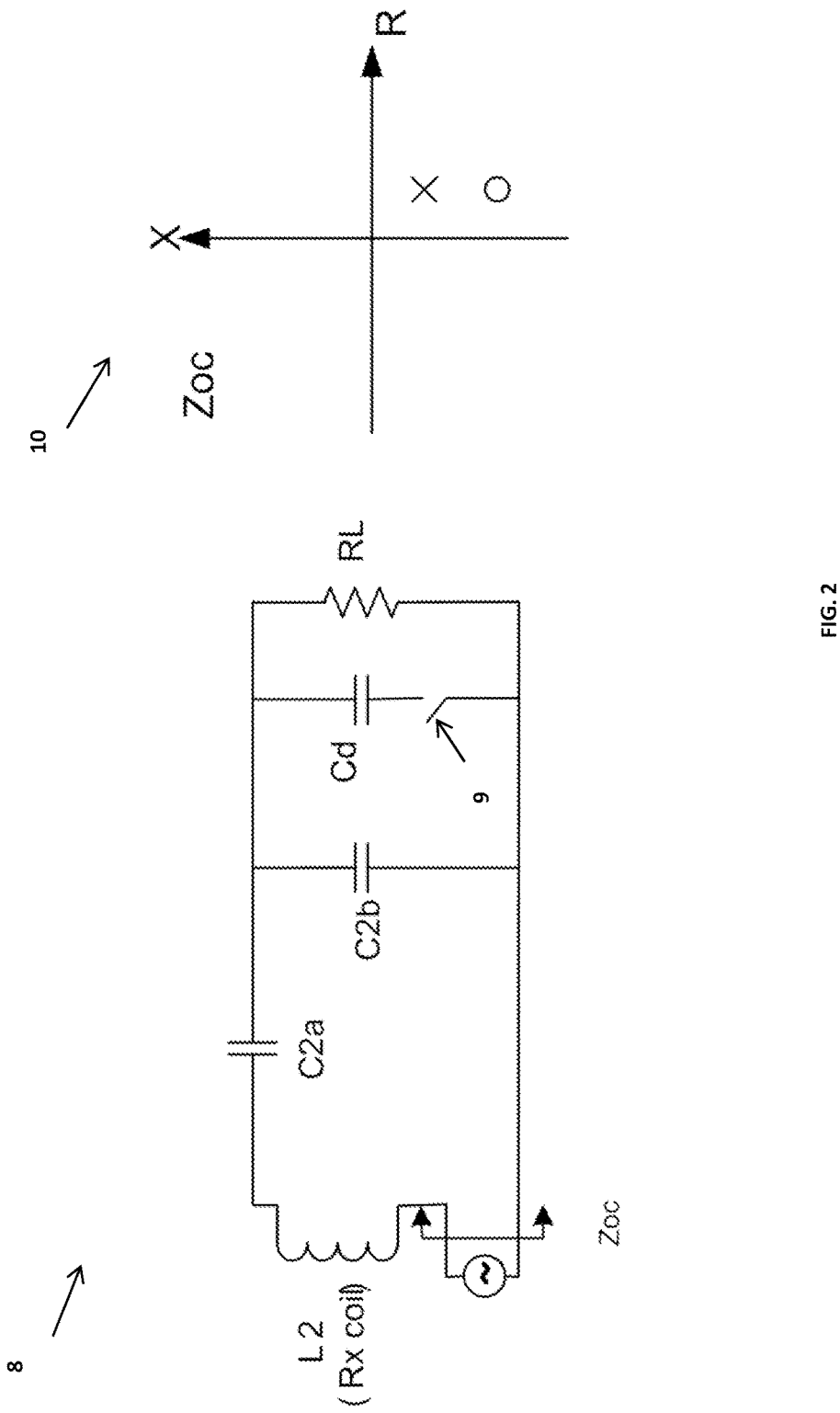
FIG. 2 is a circuit diagram illustrating a series-parallel receiver circuit with Zoc adjustment capacitor.

In the series-parallel resonant circuit of FIG. 2, the capacitor Cd can be switched in or out of the circuit. The open-circuit impedance is altered as a result. If the switch is open, the open-circuit impedance Zoc is given by $$Z_{oc1} = j\omega L + \frac{1}{j\omega C_{2a}} + \left(j\omega C_{2b} + \frac{1}{R_L}\right)^{-1} \qquad \text{Eq. 2}$$

If the switch is closed, Zoc is given by $$Z_{oc2} = j\omega L + \frac{1}{j\omega C_{2a}} + \left(j\omega C_{2b} + j\omega C_d + \frac{1}{R_L}\right)^{-1} \qquad \text{Eq. 3}$$

A capacitor that can be switched in to adjust the open-circuit impedance Zoc, such as Cd in this example, is defined as a Zoc-adjustment capacitor.

The two open-circuit impedances can be represented as the "X" and "O" symbols on the complex impedance plane 10, as shown in FIG. 2. The magnitude of the change depends on the relative values of the inductors L2 and capacitors C2a, C2b, Cd in the resonant circuit 8. Changing the open-circuit impedance also changes the reflected impedance seen by the source. Depending on the tuning of the system, either one may give a higher ac voltage at the rectifier input. Thus it is possible to design a RWP receiver in one of two ways:

1. Tune the receiver for normal operation with the switch open, and close the switch in an excess power condition to reduce the ac voltage at the rectifier input.

2. Tune the receiver for normal operation with the switch closed, and open the switch in an excess power condition to reduce the ac voltage at the rectifier input.

If the capacitance values of C2a and C2b are comparable, the circuit of FIG. 2 has the particular advantage that the voltage across the switch 9 is reduced compared to the coil voltage. This is advantageous for the implementation of the switch in a semiconductor process that may have a limited voltage tolerance.

Figure 3:
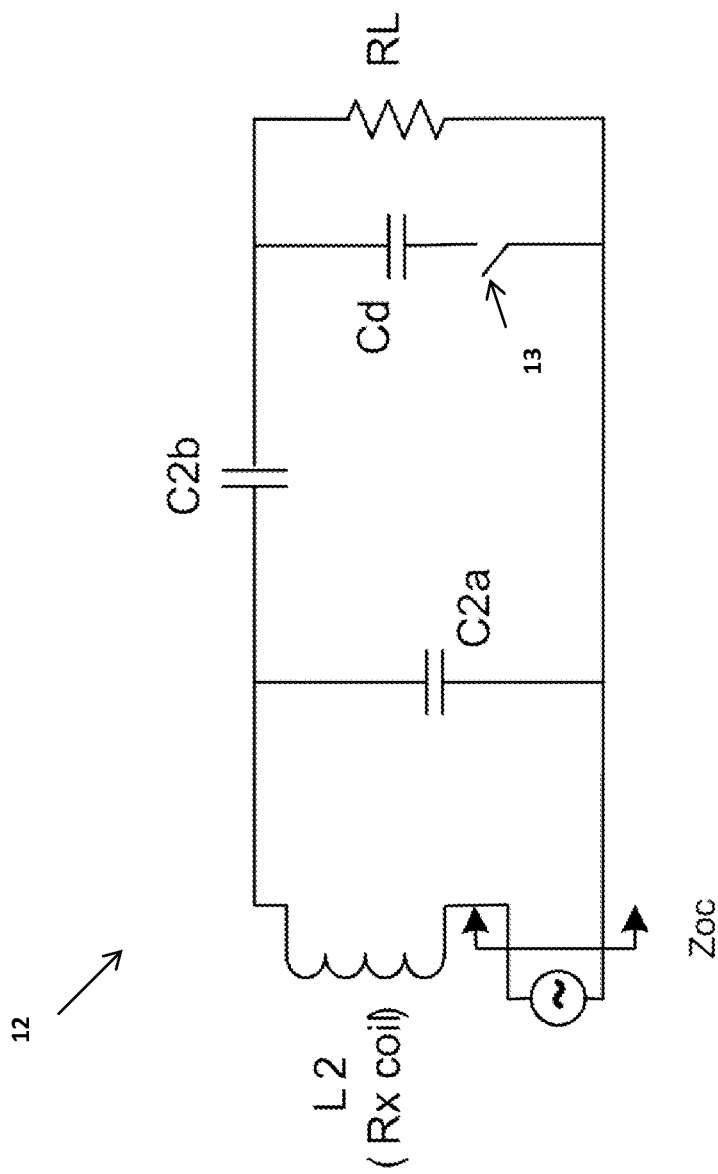
FIG. 3 is a circuit diagram illustrating a parallel-series receiver circuit with Zoc-adjustment capacitor.

FIG. 3 shows a parallel-series topology of a receiver circuit 12 that includes a Zoc-adjustment capacitor. As in the series-parallel receiver, the Zoc-adjustment capacitor Cd can be either normally in-circuit or normally out-of-circuit. The circuit 12 of FIG. 3 also has the advantageous property that the voltage across the switch 13 can be substantially lower than the coil voltage, provided that C2b is not much larger than C2a.

Figure 4:
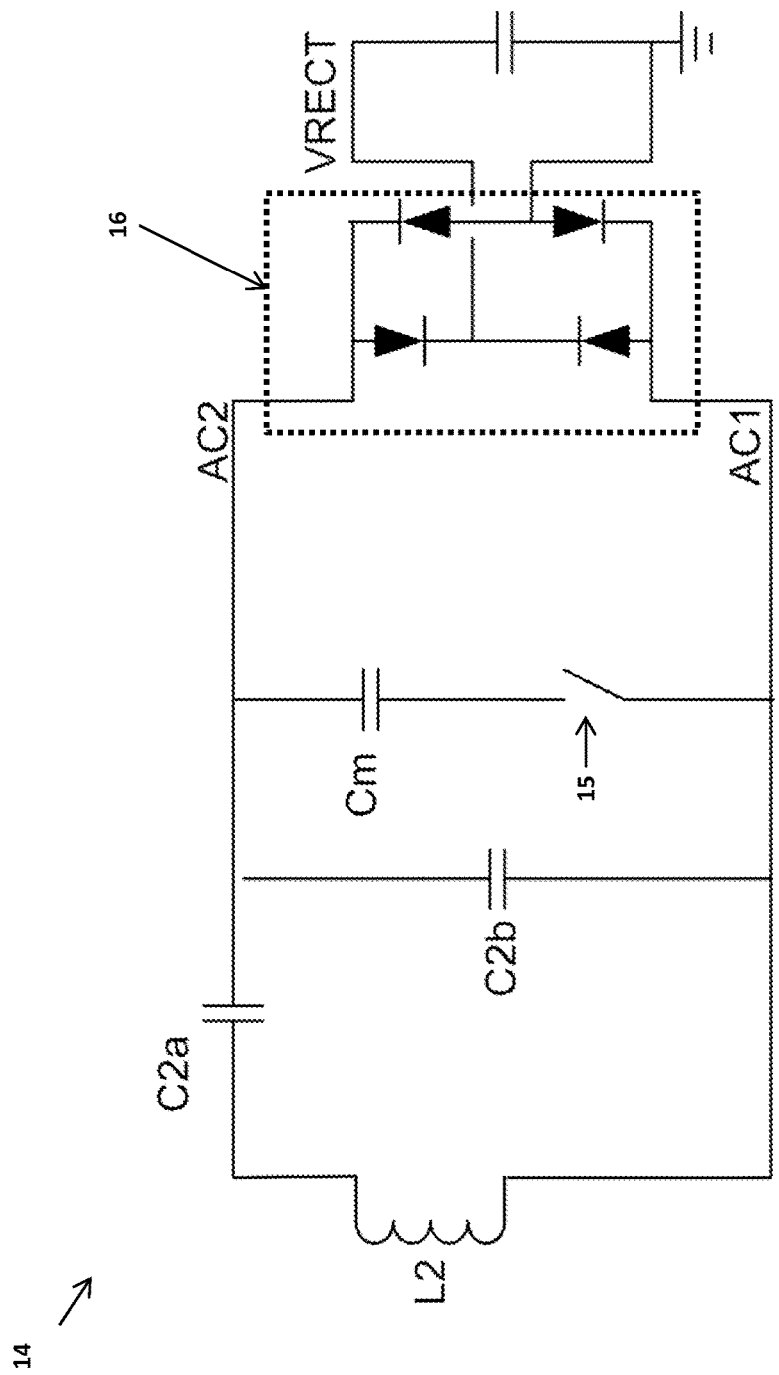
FIG. 4 is a circuit diagram illustrating a RWP receiver with a diode rectifier.

FIG. 4 shows an implementation of a receiver circuit 14 in which the ac power is rectified using a diode rectifier 16 to produce a dc voltage supply VRECT. This circuit can be represented for AC analysis by the circuit of FIG. 2. Any design of a rectifier can be used, including a synchronous rectifier. Note the modulation capacitor Cm is similar to the capacitor Cd, as shown in FIG. 2.

Figure 5:
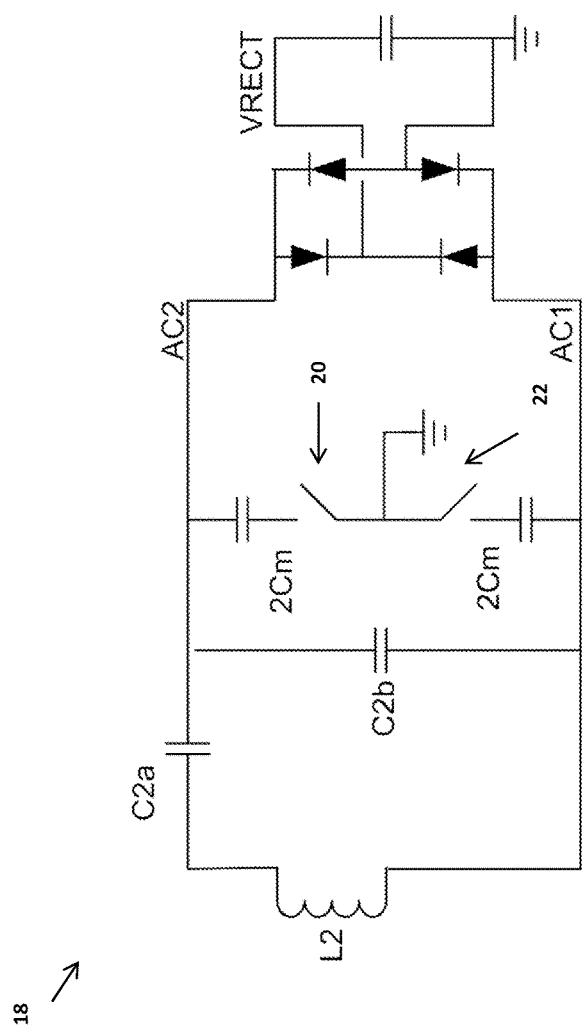
FIG. 5 is a circuit diagram illustrating a series-parallel receiver with modulation capacitors switched to ground.

FIG. 5 shows an alternative implementation of the modulation circuit 18 that is electrically equivalent to FIG. 4. The modulation capacitance is split into two capacitors of value 2 Cm. The series combination of these two capacitors has a capacitance Cm. Switching the capacitors to ground instead of across the AC terminals reduces the voltage stress on the switches 20, 22, making this implementation more suitable for an integrated circuit implementation.

The techniques described herein adaptively alters the open-circuit impedance of any resonant receiver to reduce the ac voltage. The invention allows one to change the open-circuit impedance that also changes the reflected impedance seen by a source by tuning the system to produce a higher ac voltage at a rectifier input. Moreover, the invention demonstrate several designs of a RWP receiver by tuning the receiver for normal operation with the switch open, and close the switch in an excess power condition to reduce the ac voltage at the rectifier input. Also, a receiver can be tuned for normal operation with the switch closed, and open the switch in an excess power condition to reduce the ac voltage at the rectifier input.

Although the present invention has been shown and described with respect to several preferred embodiments thereof, various changes, omissions and additions to the form and detail thereof, may be made therein, without departing from the spirit and scope of the invention.

What is claimed is:

1. A resonant wireless power (RWP) receiver comprising:
an inductor element that couples with a resonant wireless power source; and
a capacitor arrangement coupled to the inductor element altering the open-circuit impedance of the RWP receiver to reduce an ac voltage at an input of a rectifier coupled to the capacitor arrangement, the capacitor arrangement being configured to reduce the ac voltage when a voltage of the rectifier exceeds an operating voltage of the rectifier, or when a voltage of a dc-dc converter coupled to the rectifier exceeds an operating voltage of the dc-dc converter, wherein the capacitor arrangement includes a plurality of capacitors tuned to control the ac voltage in the RWP receiver.

2. The RWP receiver of claim 1, wherein the capacitor arrangement comprises a series-parallel circuit having an capacitor that can be switched in to adjust the open-source impedance Zoc.

3. The RWP receiver of claim 1, wherein the capacitor arrangement comprises a parallel-series circuit with a Zoc-adjustment capacitor.

4. The RWP receiver of claim 1 comprising the rectifier.

5. The RWP receiver of claim 4, wherein the capacitor arrangement comprises one or more Zoc-adjustment capacitors switchable to ground.

6. The RWP receiver of claim 1, wherein the capacitor arrangement utilizes one or more switches to control the ac voltage.

7. The RWP receiver of claim 1, wherein the rectifier comprises a synchronous rectifier or diode rectifier.

8. A resonant wireless power (RWP) system comprising:
a source circuit that includes a reflected impedance in series with a source coil; and
a receiver circuit that is coupled to the source circuit using an inductor element, and includes a capacitor arrangement coupled to the inductor element altering the open-circuit impedance of the receiver circuit to reduce an ac voltage at an input of a rectifier coupled to the capacitor arrangement, the capacitor arrangement being configured to reduce the ac voltage when a voltage of the rectifier exceeds an operating voltage of the rectifier, or when a voltage of a dc-dc converter coupled to the rectifier exceeds an operating voltage of the dc-dc converter, wherein the capacitor arrangement includes a plurality of capacitors tuned to control the ac voltage in the receiver circuit.

9. The RWP system of claim 8, wherein the capacitor arrangement comprises a series-parallel circuit having a capacitor that can be switched in to adjust the open-source impedance Zoc.

10. The RWP system of claim 8, wherein the capacitor arrangement comprises a parallel-series circuit with a Zoc-adjustment capacitor.

11. The RWP system of claim 8 comprising the rectifier.

12. The RWP system of claim 11, wherein the capacitor arrangement comprises one or more Zoc-adjustment capacitors switchable to ground.

13. The RWP system of claim 8, wherein the capacitor arrangement utilizes one or more switches to control the ac voltage.

14. The RWP system of claim 8, wherein the rectifier comprises a synchronous rectifier or diode rectifier.

15. The RWP receiver of claim 6, wherein the one or more switches are open when the voltages of the rectifier and dc-dc converter are both within the respective operating voltage, and the one or more switches are closed to reduce the ac voltage when the voltage of the rectifier exceeds the operating voltage of the rectifier, or when the voltage of the dc-dc converter exceeds the operating voltage of the dc-dc converter.

16. The RWP receiver of claim 6, wherein the one or more switches are closed when the voltages of the rectifier and dc-dc converter are both within the respective operating voltages, and the one or more switches are open to reduce the ac voltage when the voltage of the rectifier exceeds the operating voltage of the rectifier, or when the voltage of the dc-dc converter exceeds the operating voltage of the dc-dc converter.

17. The RWP system of claim 13, wherein the one or more switches are open when the voltages of the rectifier and dc-dc converter are both within the respective operating voltages, and the one or more switches are closed to reduce the ac voltage when the voltage of the rectifier exceeds the operating voltage of the rectifier, or when the voltage of the dc-dc converter exceeds the operating voltage of the dc-dc converter.

18. The RWP system of claim 13, wherein the one or more switches are closed when the voltages of the rectifier and dc-dc converter are both within the respective operating voltages, and the one or more switches are open to reduce the ac voltage when the voltage of the rectifier exceeds the operating voltage of the rectifier, or when the voltage of the dc-dc converter exceeds the operating voltage of the dc-dc converter.

* * * * *

UNITED STATES PATENT AND TRADEMARK OFFICE
CERTIFICATE OF CORRECTION

PATENT NO. : 10,014,724 B2
APPLICATION NO. : 14/355212
DATED : July 3, 2018
INVENTOR(S) : Patrick Stanley Riehl et al.

It is certified that error appears in the above-identified patent and that said Letters Patent is hereby corrected as shown below:

In the Claims

Claim 15, Column 4, Line 52, replace "voltage" with --voltages--

Signed and Sealed this
Nineteenth Day of March, 2019

Andrei Iancu
*Director of the United States Patent and Trademark Office*